UNITED STATES PATENT OFFICE.

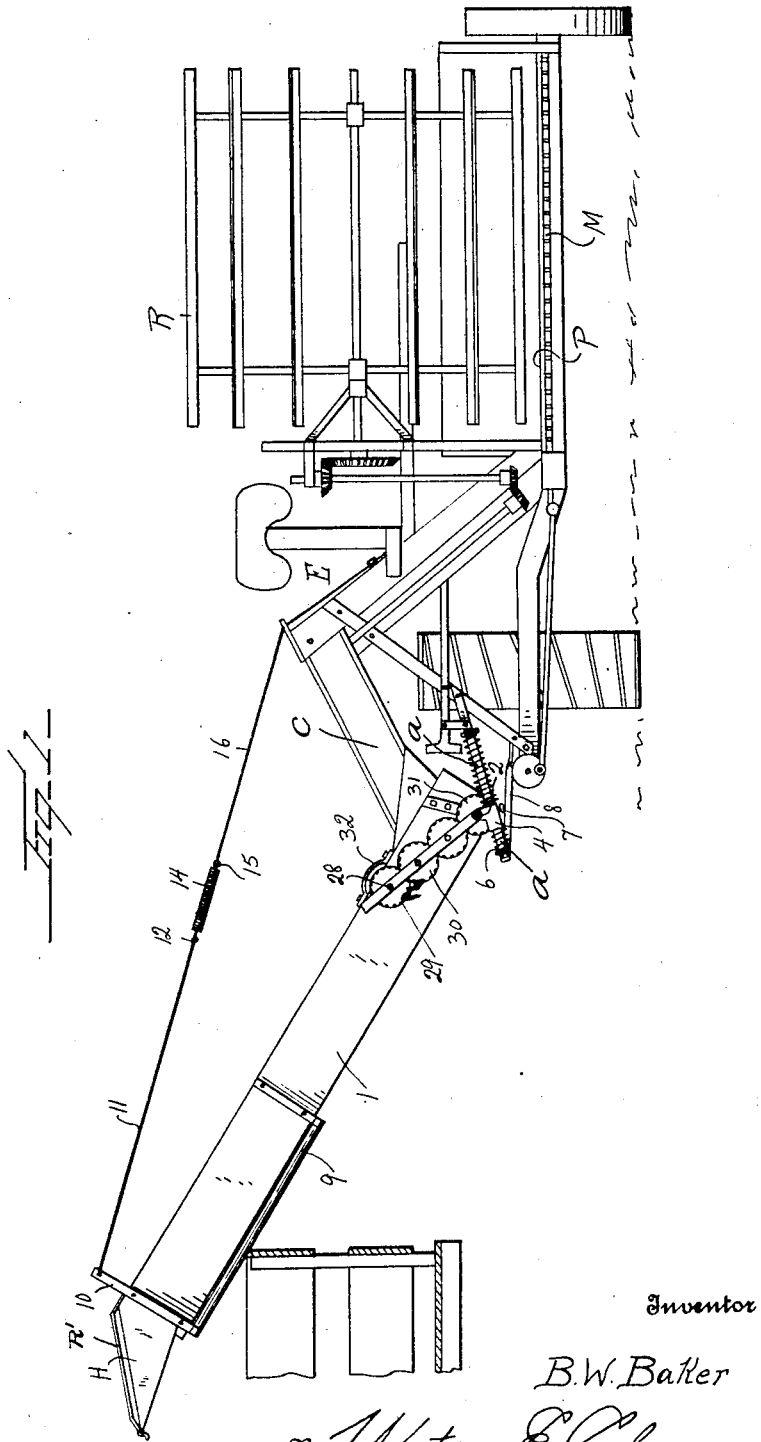

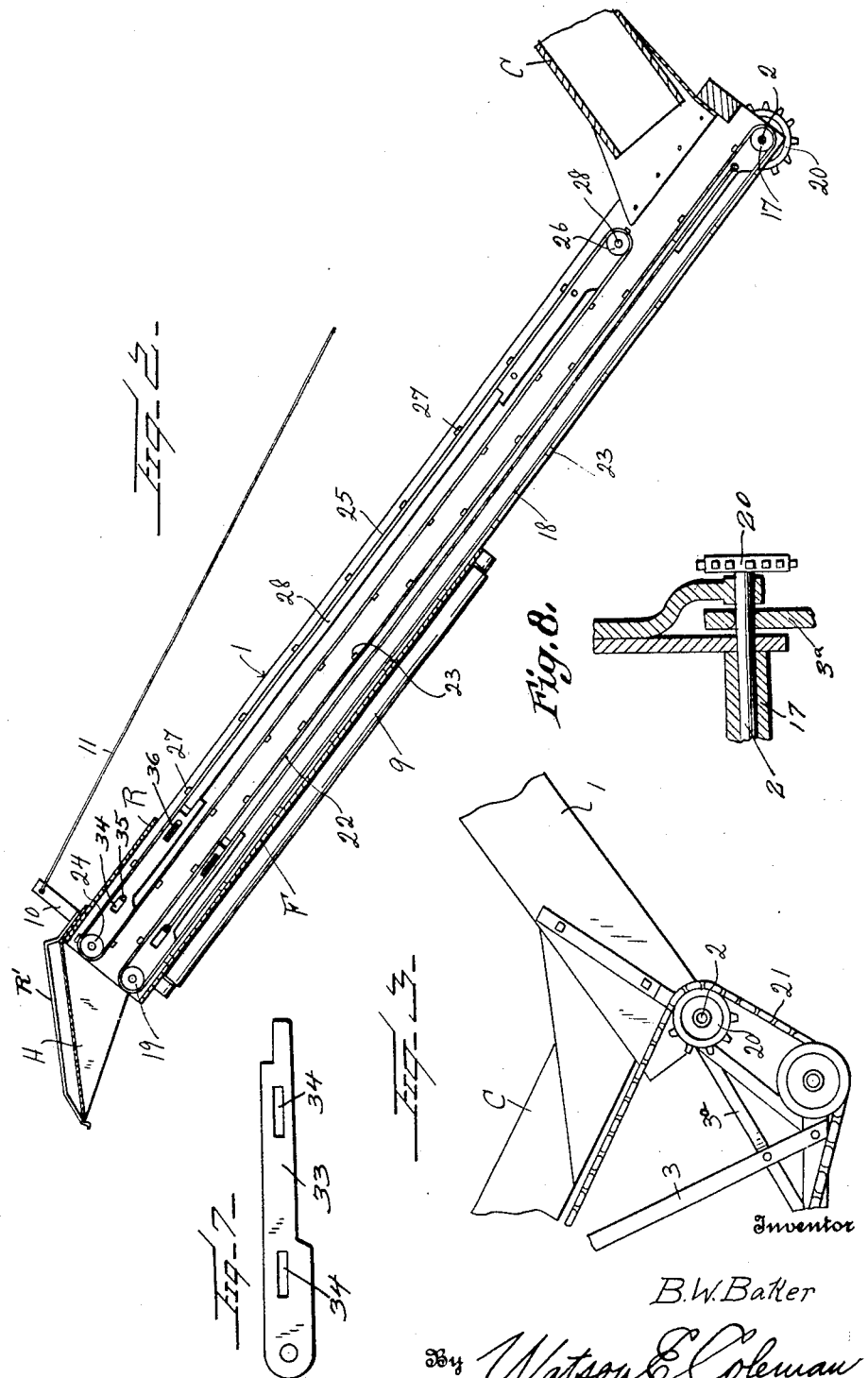

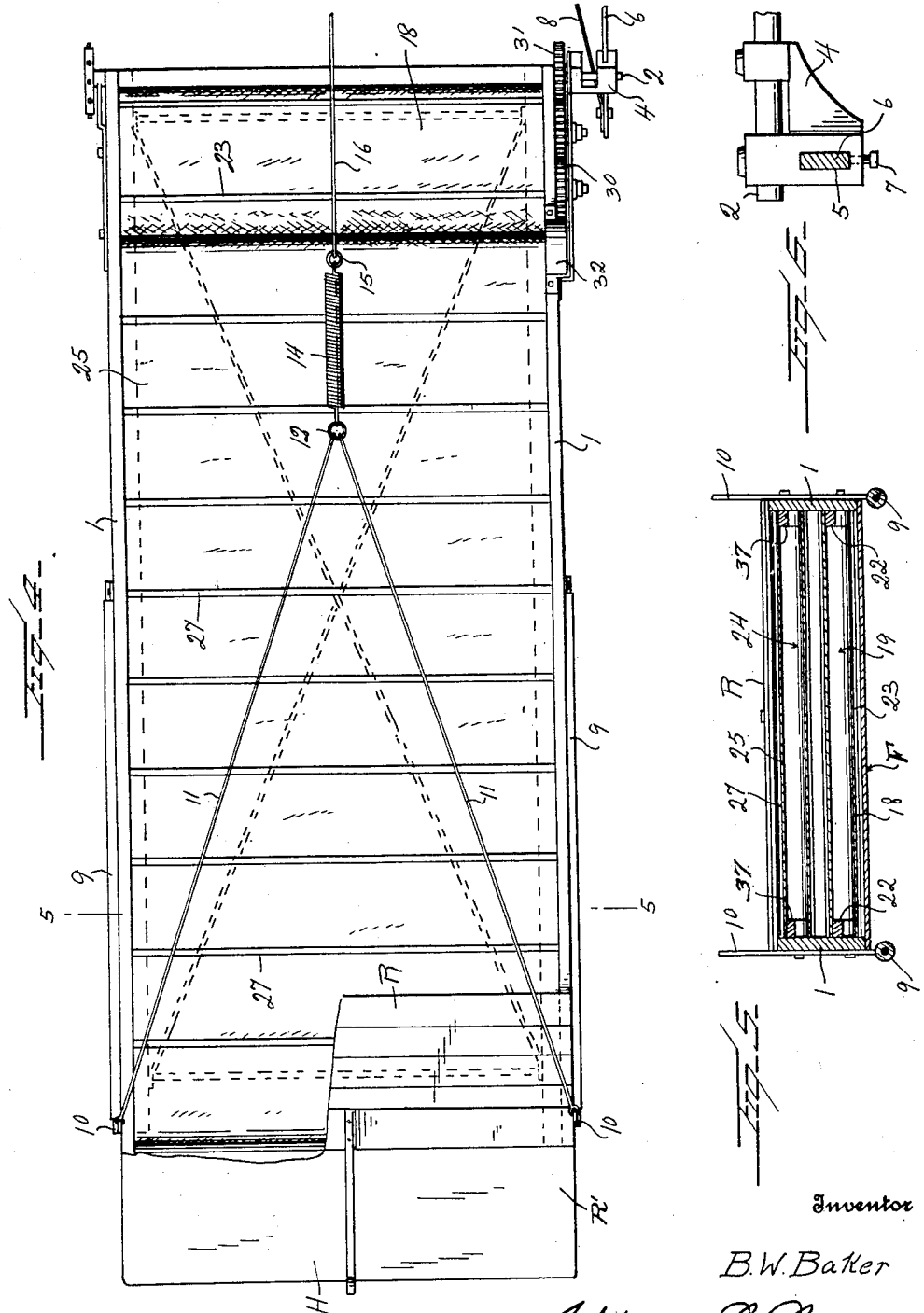

BURTON W. BAKER, OF SILESIA, MONTANA.

HARVESTER ATTACHMENT.

1,387,680.	Specification of Letters Patent.	Patented Aug. 16, 1921.

Application filed October 24, 1919. Serial No. 332,940.

*To all whom it may concern:*

Be it known that I, BURTON W. BAKER, a citizen of the United States, residing at Silesia, in the county of Sanders and State of Montana, have invented certain new and useful Improvements in Harvester Attachments, of which the following is a specification, reference being had to the accompanying drawings.

This invention relates to an improved harvester attachment and has relation more particularly to an attachment of this general character especially designed and adapted for use in connection with a harvester and which is adapted to be substituted for the binder generally employed in connection with a harvester and an object of the invention is to provide a novel and improved attachment of this general character which operates with convenience and facility to convey the grain to a receptacle.

It is also an object of the invention to provide a novel and improved device of this general character which, when applied, results in a perfect balance of the machine both from a standpoint of construction and power.

Another object of the invention is to provide a novel and improved device of this general character which serves as a conveyer to deposit grain within a receptacle or the like, and wherein the conveyer comprises two endless members in vertically spaced relation, and having their opposed stretches traveling in the same general direction, and at substantially the same speed, whereby the grain as it is delivered to the receptacle or the like is effectively protected from the wind and also assuring effective elevation.

A still further object of the invention is to provide a novel and improved device of this general character comprising two vertically spaced members having their opposed faces traveling in the same direction, and between which the grain is carried, and wherein the lower or entrance ends of said endless members are arranged in a manner to afford an enlarged throat which permits the passage of grain between the stretches of the endless members, with the possibility of clogging substantially eliminated.

The invention consists in the details of construction and in the combination and arrangement of the several parts of my improved harvester attachment whereby certain advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein;

Figure 1 is a view in side elevation illustrating an attachment constructed in accordance with an embodiment of my invention and in applied position, a coacting receptacle being shown in section;

Fig. 2 is an enlarged longitudinal vertical sectional view taken through my improved attachment, as herein disclosed, with certain of the parts omitted;

Fig. 3 is an enlarged fragmentary view in side elevation of the lower portion of my improved attachment, and opposite to that shown in Fig. 1;

Fig. 4 is an enlarged view in top plan with a portion broken away, of my attachment as herein embodied;

Fig. 5 is a sectional view taken substantially on the line 5—5 of Fig. 4;

Fig. 6 is a fragmentary view partly in elevation and partly in section of an attaching means for my improved attachment.

Fig. 7 is an enlarged fragmentary view partly in section and partly in elevation illustrating a mounting for an end portion of one of the aprons or canvases, as herein embodied, and Fig. 8 is a sectional view illustrating one form of mounting for the attachment drive shaft.

As disclosed in the accompanying drawings, P denotes a platform of a conventional type embodying a harvester of a general type, and upon which falls the grain when severed by the cutting mechanism or cycle M, also of a conventional type. Coacting with the cutting mechanism M is a reel R operated in a well known manner, and it is to be particularly noted that the reel R comprises twelve slats, which is twice the number employed in reels now in common use.

By providing the reel R with this number of slats it has been fully demonstrated in actual practice that an effective delivery of the grain from the cutting mechanism M to the platform P may be effected with a slow running reel, as the reel performs twice the work of the reel commonly used, and without the necessity of increasing the power.

The grain is conveyed upwardly from the platform P in a conventional manner by the elevator E, which delivers upon the chute C.

The foregoing structure, with the exception of the specific feature of the reel R, is substantially the same as embodied in the well known types of harvesters which are provided with binder attachments, but my improved attachment is substituted in place of the binder attachment and operates to convey the grain to a receptacle in a manner whereby a saving is effected of the short grain, which is so often lost in shocking, and which short grain it is almost impossible to tie with a binder.

My improved attachment comprises the elongated side members 1 in predetermined spaced relation, and which rotatably support at one end portion, the transversely disposed shaft 2 extending beyond opposite sides thereof. This shaft 2 constitutes the driving member for my improved attachment as herein disclosed and occupies the position normally occupied by the packer shaft of the harvester.

An end portion of the shaft 2 is disposed through an opening formed in a rigid member or strap 3$^a$ bolted or otherwise anchored to the lower end portion of a strut 3 comprised in the supporting structure for the elevator E. The opening of the strut with which the shaft 2 is engaged is such as to permit of limited horizontal oscillation of the opposite end of the shaft. Engaged with the opposite end portion of the shaft 2 is a casting 4 provided with an opening 5, through which is slidably directed a strap 6. The casting 4 is adjustable longitudinally of the strap 6 and held in desired position through the instrumentality of a binding screw 7, whereby the desired adjustment may be obtained on my improved attachment with respect to the chute C, as the occasions of practice may necessitate. The inner end portion of the strap 6 is adapted to be bolted or otherwise suitably engaged with a strut of the supporting structure for the elevator E, and the outer extremity of said strap 6 has engaged therewith a bracing strap 8, which is also adapted to be suitably engaged with the supporting structure.

Encircling the strap 6 at opposite sides of the casting 4 are the coil springs $a$, and which bear against the casting 4 to further hold the same in place until some object moves the attachment from its normal position, as in the case of a receptacle being driven under the attachment and striking the same. In such event the springs $a$ take the strain and give the necessary freedom of movement, thus eliminating possible breakage. While this movement of the casting 4 is slight, it is to be understood that a movement of one inch or two inches of the casting 4 will result in a movement of a foot or more at the upper portion of the attachment, so that the freedom of movement along the side of a receptacle is sufficient to take care of any ordinary shock that may occur, and when the strain is removed, the attachment will return to its normal position by the tension of the springs $a$.

In addition to serving as a driving means for my improved attachment, the shaft 2 also operates as a fulcrum about which the side boards 1 are vertically adjusted, so that the upper or outer end portions of said side boards 1 may be caused to rest upon the side of a barge or the like and extend inwardly thereof. The upper or outer end portions of the side boards 1 have rotatably supported therebeneath the rollers 9, which are adapted to have direct contact with the side of a barge, and said rollers 9 afford means which assures freedom of movement of the receptacle with respect to the side boards 1, and with a minimum of frictional resistance. The outer or upper end portions of the side boards 1 are provided with the upstanding posts 10 to which are secured the rods 11. The rods 11 converge inwardly one with respect to the other, and have their inner extremities connected by the ring 12 or the like. Suitably secured to the ring 12 is an end portion of a retractile member 14, herein disclosed as a coil spring, and the opposite end portion of said member is secured to a ring 15. Engaged with the ring 15 is an end portion of a flexible member 16 adapted to be tied or otherwise engaged to the harvester or header, and which affords means to raise or lower the outer or upper end portions of the side boards 1, as may be occasioned by the requirements of practice.

Fixed to the shaft 2 is a drum 17 around which passes an endless apron or canvas 18, which is also directed around a drum 19, rotatably supported between the side boards 1 adjacent their outer or upper ends, and substantially in longitudinal alinement with the drum 17. The rotation of the shaft 2 is in a direction whereby the upper stretch of the apron or canvas 18 travels upwardly.

As herein embodied the shaft 2 is provided at one end portion with a sprocket 20, fixed thereto, and which is engaged by the chain 21, which operates, in a conventional manner, the other movable parts of the harvester. In other words the chain 21 is similar to the chain employed with harvesters provided with a binder attachment. The upper stretch of the apron or canvas 18 has its marginal portions riding over and along the ways or guides 22, suitably affixed to the opposed faces of the side boards 1, whereby said upper stretch is prevented from sagging.

The apron or canvas 18 is also provided with cross cleats or strips 23, which operate to maintain said apron or canvas in desired position and to facilitate the carrying of the load therewith.

In transverse alinement with the upper drum 19 and spaced thereabove is a drum 24, around which passes a second endless apron or canvas 25. The apron or canvas 25 extends longitudinally of the side boards 1, and is also directed around another drum 26 rotatably supported between the side boards 1 adjacent their lower end, but at a point inwardly of the drum 17, whereby said drums 26 and 17 are arranged in a manner to afford a throat whereby the entrance or passage of the grain between the aprons or canvases 18 and 25 is materially facilitated, with the possibility of clogging substantially eliminated. The apron or canvas 25 is also provided with the transversely disposed cleats or strips 27, and the upper stretch of said apron or canvas 25 engages and passes over the ways or guides 37, also suitably secured to the opposed faces of the side boards 1.

The lower stretch of the apron or canvas 25 also moves upwardly or outwardly with respect to the side boards 1, and at substantially the same speed as the upper stretch of the apron or canvas 18, and for which reason the shaft 2 is in driving connection with the shaft 28 of the drum 26. The shaft 28 extends beyond one side of the attachment and to said extended portion is affixed a gear wheel 29, which is operatively engaged by the gear train 30 with the gear 31 suitably affixed to an end portion of the shaft 2. The gears in the train 30 are equal in number, and preferably two in number, with the gears 29 and 31 of the same ratio, and the diameters of the drums 17 and 26 are the same. By this arrangement it will be at once self-evident that the opposed stretches of the aprons or canvases 18 and 25 will both travel in the same direction and at substantially the same speed, so that further means is provided to prevent clogging or other hindrance to the passage of the grain upwardly between the side boards for discharge within the receptacle.

It is to be noted that the chute C delivers upon the upper stretch of the apron or canvas 18 at a point inwardly or below the upper apron or canvas 25, and it is to be further noted that the chute C is inclosed, so that as the grain passes thereover upon the apron or canvas 18 said grain is protected from the wind. As the grain passes upwardly between the aprons or canvases 18 and 25 it will also be noted that the same is effectively protected against the wind, and which protection is further facilitated by the side boards 1, as such boards are of a width to bridge the space between the opposed stretches of the aprons or canvases 18 and 25.

When the grain is damp or when it is raining, the aprons or canvases 18 and 25 will shrink, owing to the nature of the material, and break the cleats or strips 27 unless provision is made to compensate for such shrinkage. As is particularly illustrated in Fig. 2 the drums 19 and 24 are rotatably engaged with the ways or supports 33. Each of the ways or supports 33 is provided with a pair of longitudinally disposed slots 34, through which is directed the bolts 35 for holding said way or support to the adjacent side board or member 1. Arranged within one of the slots and interposed between the bolt 35 therein and the outer end of said slot is an expansible member or coil spring 36, which constantly urges said way or support 33 outwardly.

I also find it of advantage to substantially surround the gears 29, 30 and 31 with a housing 32, so that the same are protected against obstruction or hindrance by grain or the like, which would otherwise come in contact therewith and have a tendency to choke the same.

The upper end portions of the lower edges of the side boards 1 have secured thereto the flooring F extending inwardly of said side boards a distance substantialy equal to the length of the rollers 9, which affords protection to the bottom stretch of the lower apron or canvas 18. The top edges of the side boards 1 at the upper or outer portions thereof have secured thereto a roofing R' extending a slight distance inwardly of the side boards 1. Secured to the side boards 1 and to the roofing R' is a hood H, and which hood serves as a means to protect the grain from the wind as the same is discharged from between the aprons or canvases 18 and 25 into the receptacle.

From the foregoing description, it is thought to be obvious that a harvester attachment constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with a supporting structure, a conveyer comprising side boards, a shaft rotatably supported by said side boards adjacent one end, connections between the shaft and the supporting structure, said connections including a member engaged with the shaft, said member being provided with an opening, a strap slidably disposed through the opening and engaged with the supporting structure, means for clamping the member on the shaft to the strap, and an endless member in driven connection with the shaft.

2. In combination with a supporting structure, a conveyer comprising side boards, a shaft rotatably supported by said side boards adjacent one end, connections between the shaft and the supporting structure, said connections including a member engaged with the shaft, said member being provided with an opening, a strap slidably disposed through the opening and engaged with the supporting structure, means for clamping the member on the shaft to the strap, an endless member in driven connection with the shaft, and a second strap secured to the outer end portion of the first named strap and to the supporting structure.

3. In combination with a supporting structure, a conveyer comprising side boards, a shaft rotatably supported by said side boards adjacent one end, connections between the shaft and the supporting structure, said connections including a member engaged with the shaft, said member being provided with an opening, a strap slidably disposed with an opening, a strap slidably disposed through the opening and engaged with the supporting structure, springs carried by the strap at opposite sides of the member for maintaining said member in a normal position upon the strap, and an endless member in driven connection with the shaft.

4. In a combination with a harvester, a conveyer attachment therefor, and means connecting one end of said conveyer and said harvester permitting horizontal oscillation of the free end of the conveyer.

5. In a combination with a harvester, a conveyer attachment therefor, means connecting one end of said conveyer, said harvester permitting horizontal oscillation of the free end of the conveyer, and means yieldably resisting such horizontal oscillation.

6. In a combination with a harvester, a conveyer attachment therefor, and means connecting one end of said conveyer and said harvester permitting movement in a vertical direction and also a horizontal oscillation of the free end of the conveyer.

In testimony whereof I hereunto affix my signature.

BURTON W. BAKER.